March 29, 1938.    D. RODGERS    2,112,635
LIQUID LEVEL INDICATOR
Filed Oct. 8, 1937

INVENTOR.
Dominick Rodgers
BY
*J. B. Forte*
ATTORNEY.

Patented Mar. 29, 1938

2,112,635

UNITED STATES PATENT OFFICE 2,112,635

LIQUID LEVEL INDICATOR

Dominick Rodgers, Pittsburgh, Pa.

Application October 8, 1937, Serial No. 168,092

3 Claims. (Cl. 33—209)

This invention relates to level indicators and among its objects is to provide an instrument for indicating the angularity of an object upon which the indicator is supported, with respect to a horizontal axis or plane.

This invention is adaptable to all forms of moving objects, such as machinery and mechanism, and also to vehicles, such as automobiles or airplanes, in which the indicator may be mounted upon the instrument board to indicate the angle of ascent or descent either in the air, or upon a hill, in the case of an automobile.

A preferred form of the level indicator embodying the principles of my invention is illustrated in the accompanying drawing, in which Figure 1 is a front elevational view with parts broken away, of the level indicator in its supporting frame;

Figure 1:
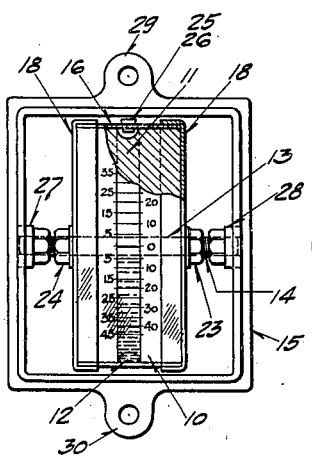
Figure 6:
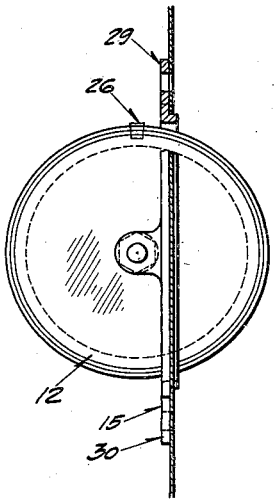
Figures 6 and 7 are side and front elevational views, respectively, of the supporting frame for the indicator.
Figure 7:
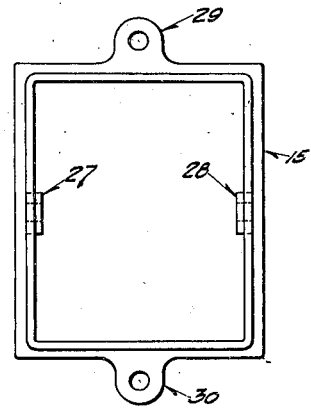
Figure 2:
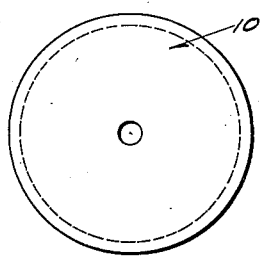
Figure 2 is an end elevational view of the grooved body for the indicating liquid.
Figure 3:
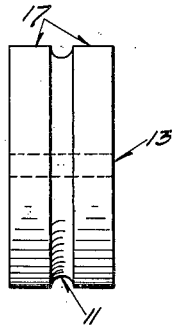
Figure 3 is a side elevational view of the grooved body in Figure 2.
Figure 8:
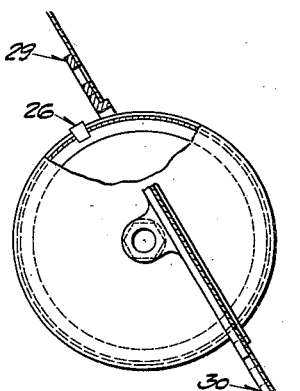
Figure 8 is a side view of the frame mounted on an inclined dashboard.
Figure 4:
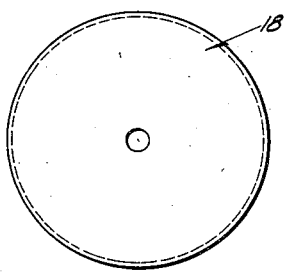
Figure 4 is a side elevational view of the grooved body in Figure 2.

As illustrated in Figure 1, the level indicator comprises a cylindrical body member 10 having a circumferential groove 11 centrally located between the ends of the cylindrical body or core 10, to permit a volume of liquid 12 to move freely around the core 10 as it is turned around its axis in response to the movement of a support or body, such as a machine or mechanism or vehicle, upon which the indicator is mounted.

The body core 10 is also provided with a hole 13 extending axially throughout its length, to accommodate a locking bolt 14 for locking the elements of the indicator together and for supporting the indicator upon a frame 15.

In order to keep the fluid 12 in position in the groove 11, the body core 10 is covered by a closely fitting transparent tube or cylinder 16 which closely engages the side surfaces 17 on the cylindrical body core 10 to prevent the fluid from moving between the body 10 and the cylindrical cover 16. The transparent cylindrical cover 16 is marked on the upper and lower front quadrants to indicate the angular distances at the marked points, from a predetermined zero or horizontal position. If desired, the peripheral surface of the body core 10 may be marked instead.

Figure 5:
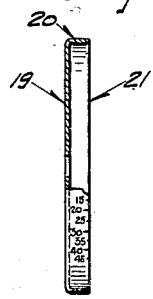
Figure 5 is a side elevational view of the cap in Figure 4.

The two ends of the body core 10 and the ends of the cylindrical transparent cover 16 are covered by two end caps 18, and each cap is provided with an end base 19 and a cylindrical side wall 20. The end wall or base 19 engages the end surface of the body core 10, and the cylindrical side wall 20 of the cap covers the corresponding portion of the body core 10. Where the body 10 or cylinder 16 is marked with graduations, the outer cap surface 20 is plain and unmarked. Where desired, however, the body and the cylinder may be left unmarked and the side wall surface 26 of the cap marked as indicated in Figure 5.

The two end caps 18 are held in position at the ends of the indicator by means of the bolt 14 which extends through the body core 10 and through openings in the two end caps. The caps and the body elements are locked in position on the bolt 14 by means of lock nuts 23 and 24.

In order that the indicator may be readily and easily filled with the indicating liquid, after it has been assembled, the transparent covering cylinder 16 is provided with a small opening 25 through which the fluid may be introduced into the groove 11. After a sufficient amount has been introduced to cause the upper level of the fluid to reach the predetermined zero line mark on the indicating cap, the opening 25 is closed by a suitable rubber plug 26.

In order that the indicator may be easily mounted upon dashboards of various angles or upon other supporting brackets, the frame 15 is provided with two side lugs 27 and 28 for supporting the ends of the bolt 14 as trunnions to permit the indicator to be adjusted to the proper position at which the top level of the liquid will be at the zero line when the device or bracket upon which the indicator is mounted is in a position corresponding to a horizontal or level position of its support. The side lugs may be made slightly resilient to permit the supporting bolt 14 to be easily inserted between them. After the indicator has been properly located in the side lugs or brackets 27 and 28, it may be secured in position by means of additional lock nuts on the bolt 14. The frame is also provided with two additional lugs 29 and 30 to enable the frame to be secured in position on the supporting bracket or dashboard upon which it is to be mounted.

My invention is not limited to the specific details of construction that are illustrated, but may be modified without departing from the spirit and scope of the invention as set forth in the appended claims.

I claim as my invention:

1. A level indicator comprising a cylindrical body element having a groove extending around its circular periphery for receiving a body of liquid, a transparent cylindrical cover closely fitting the element and confining the liquid to the groove, a side cover fitting closely over each end of the body and the cylindrical cover, each side cover carrying angle-indicating indicia to indicate the angular movement of the liquid from a predetermined horizontal position, means for securing the side covers in position to cause a selected level of the indicator liquid to correspond to a horizontal position.

2. A liquid level indicator comprising a cylindrical body member having a circular groove circumferentially around the body member, the adjoining peripheral surfaces being in substantially the same cylindrical plane, a transparent cylinder covering the body member and closely engaging the peripheral surfaces on either side of the groove, a body of liquid in the groove and held therein by the transparent cylinder, two enclosure caps for the two ends of the body member and the transparent cylinder, said caps having figures thereon showing the angular distance of the figures from a horizontal position, means for holding the caps in position on the body, and means for supporting the indicator.

3. A level indicator comprising a cylindrical body having a circumferential groove around the body, a transparent cylindrical cover engaging the body on both sides of the groove to isolate the groove, a body of liquid in the groove, an end cap covering each end of the body and its cover and embodying an inwardly extending cylindrical portion engaging the transparent cylinder, each extending portion of the cap being marked into quadrants with readings of angular spacing from a predetermined zero or horizontal position.

DOMINICK RODGERS.